United States Patent

Bieganski

[11] Patent Number: 5,491,894
[45] Date of Patent: Feb. 20, 1996

[54] WIRE STRIPPING TOOLS

[75] Inventor: Zdzislaw Bieganski, Harpenden, United Kingdom

[73] Assignee: ZB New Products Limited, Bedfordshire, Great Britain

[21] Appl. No.: 309,767

[22] Filed: Sep. 21, 1994

[30] Foreign Application Priority Data

Sep. 24, 1993 [GB] United Kingdom .................... 9319719

[51] Int. Cl.⁶ ...................................................... H02G 1/12
[52] U.S. Cl. .................................. 30/90.1; 81/9.43; 81/9.41
[58] Field of Search .................................. 30/90.1; 81/9.4, 81/9.41, 9.43, 9.44

[56] References Cited

U.S. PATENT DOCUMENTS

| | | | |
|---|---|---|---|
| 3,122,036 | 2/1964 | Flower et al. | 81/9.41 |
| 3,422,708 | 1/1969 | Bieganski | 81/9.43 |
| 3,596,541 | 8/1971 | Bieganski | 81/9.43 |
| 4,112,791 | 9/1978 | Wiener | 81/9.43 |
| 4,475,418 | 10/1984 | Tani | 81/9.43 |

*Primary Examiner*—Hwei-Siu Payer
*Attorney, Agent, or Firm*—Learman & McCulloch

[57] ABSTRACT

A wire stripper has outer jaws to grip the wire sheath and inner jaws to cut into the sheath before the inner jaws are displaced along the cable relative to the outer jaws to strip the cut portion. An eccentric adjuster is provided to vary the position of one inner jaw relative to its outer jaw so as to cope with widely different insulation thicknesses.

5 Claims, 2 Drawing Sheets

WIRE STRIPPING TOOLS

This invention relates to wire stripping tools of the kind comprising a pair of outer jaws which are arranged to be closed together to grip a cable therebetween, and a pair of inner jaws arranged to cut into the cable to at least part sever the outer sheath of the cable so as to enable that to be stripped off the wire core for the purpose of baring the wire to enable a termination to be attached. The stripping is effected by displacing the cutting jaws relative to the gripping jaws along the axis of the cable.

BACKGROUND OF THE INVENTION

The inner jaws are in effect closed together by the outer jaws, and the degree of penetration of the cutting edges depends upon the extent to which they project beyond the gripping jaws. Thus, if each cutting jaw projects say 1 mm beyond the adjacent gripping jaw, then the tool is appropriate to cut an insulation sheath of the order of 1 mm thick. In practice it is preferred to part-sever the insulation so as to avoid the cutting edge coming into contact with the wire core and possibly damaging the same, and the stripping is effected by tearing the sheath at the point of cut. Nevertheless there is a limit to the thickness which can be stripped for any particular depth of cut. It is therefore known to provide an adjuster for the purpose of varying the projection of the cutting edge relative to the gripping face. The known adjusters provide a screw having the axis perpendicular to the axis of the cable. In order to make the adjustment predictable and repeatable, only a single revolution of the screw is used in conjunction with angularly movable indicia and a fixed reference point, but these adjusters have been unsatisfactory in that it is easily possible to turn the screw through more than one revolution thus making the reference indication unreliable, and if limited to the single turn, the construction becomes complex and at best the extent of adjustment is small.

The object of the invention is to provide improvements.

SUMMARY OF THE INVENTION

According to the invention considered broadly, a cam is mounted to be effective between an inner jaw and the adjacent outer jaw, to vary the relative positions of the two.

Preferably the cam is an eccentric pivotable on a pin extending transversely of the outer jaw and having an integral radial projection or lever extending to the exterior of the outer jaw for angularly shifting the eccentric.

Preferably also a blade spring is disposed between the eccentric and the inner jaw, and according to an important feature of the invention the eccentric has a serrated, knurled or ribbed surface (herein collectively called serrated) and the adjacent face of the blade is likewise serrated so that the angular position of the eccentric is frictionally held by the cooperating serrations.

It is found in an experimental tool that the provision of an eccentric adjuster between one inner jaw and the adjacent outer jaw extends the range of a wire stripping tool substantially, but it would be within the scope of the invention to provide such adjusters on both of the pairs of jaws to give an even greater range.

THE DRAWINGS

Further features of the invention will be apparent from the following description of a presently preferred embodiment of the invention which is now more particularly described with reference to the accompanying drawings wherein.

DETAILED DESCRIPTION

Figure 1:
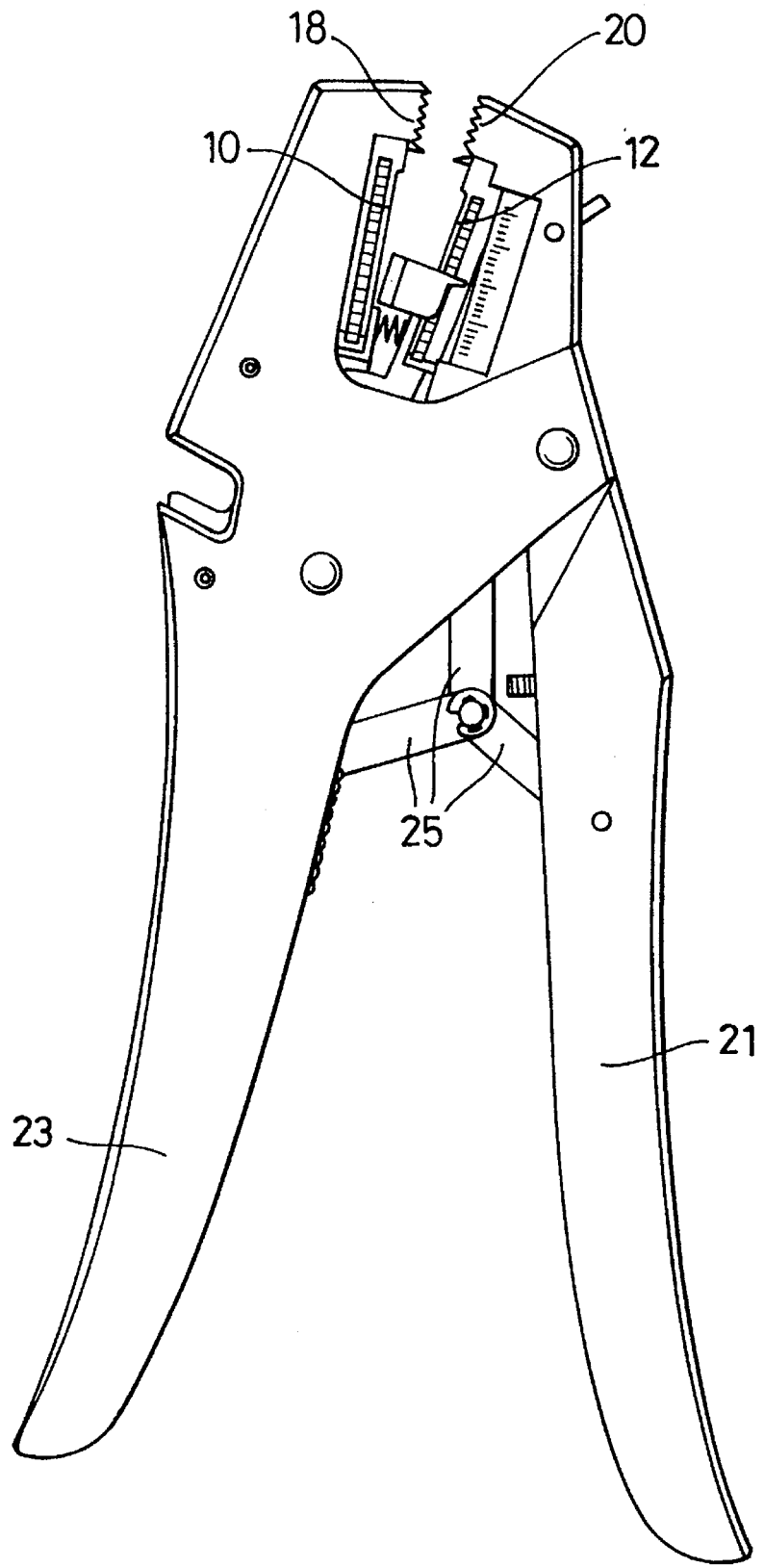
FIG. 1 is an elevation of a stripping tool.
Figure 2:
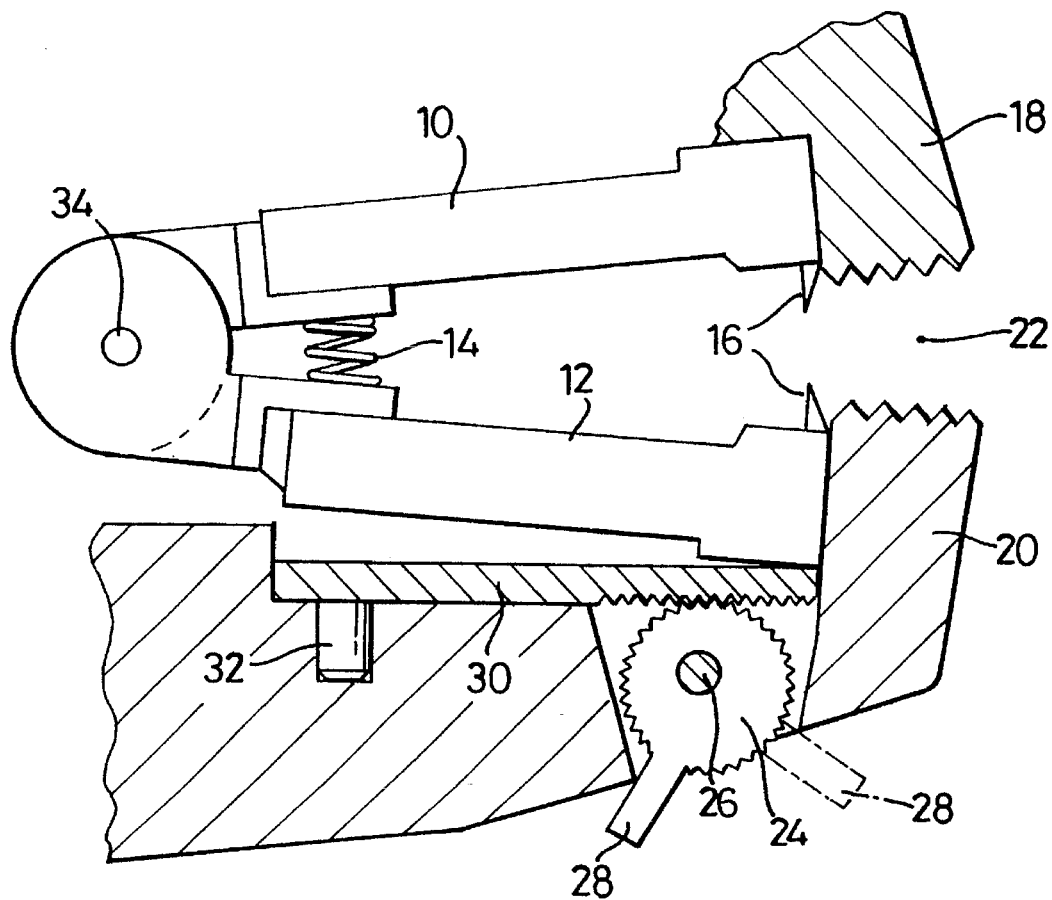
FIG. 2 is an enlarged fragmentary and part-sectional view thereof.

Turning now to the accompanying drawings, the tool has a pair of inner jaws 10, 12 which in this embodiment are pivoted together on pin 34. Spring 14 is used to urge the jaws apart. Each jaw has a cutting end 16 in the form of cutting teeth.

Each inner jaw may be a stack of laminations which together define the cutting edge, and which are capable of independent movement so as to conform to the cross section of the cable, in known fashion and as is shown in U.S. Pat. No. 3,596,541.

The inner jaws lie between a pair of outer jaws 18, 20. A lever handle 21 is squeezed towards handle 23 to close the outer jaws together. A linkage 25 in known fashion in such wire stripping tools causes the inner jaws to be subsequently displaced along the axis of the cable when in the closed position to effect the stripping, and this is accomplished by a tie rod (not shown) coupled to the pin 34, and the coupling to the lever mechanism is such that a first part of the lever mechanism closes the jaws 18, 20 together to grip the cable in the zone 22 and cause the cutting edges of the teeth 16 to penetrate the sheath, following which displacement of the pin 34 away from the point 22 effects the stripping, and reopens the jaws at the end of the stripping stroke. Since these features follow conventional practice with a number of choices available to the designer, it is unnecessary to describe them further in this specification.

At least one of the jaws, in this embodiment the jaw 20, is provided with a recess to accommodate a flat strip 30 which acts somewhat as a blade spring. This blade is made as a plastics moulding from a hard relatively rigid but slightly resiliently flexible plastics material, and has an integral normally projecting stud 32 which is received in a bore in the jaw 20. The effect of the stud is to hold the adjacent end of the blade relatively fixed, but enable the opposite and free end of the blade to flex. The undersurface of the blade is transversely serrated.

A cam having an eccentric 24 is pivoted on the pin 26 and lies in an aperture extending through the thickness of the jaw. The eccentric is also serrated and the serrations engage with those of the blade, as illustrated. The eccentric may conveniently, but not necessarily, have a radial and integral lover portion 28 extending to the exterior, to enable manual manipulation of the eccentric to adjust it to any desired position and give a physical indication of the adjusted position.

It will be appreciated that in movement of the eccentric from the full line position figure to the chain dot position in the figure, the eccentric displaces the blade to flex it as mentioned and lift the adjacent inner jaw 12 and cutting edge 16 to vary the extent of projection beyond the adjacent gripping face of the jaw 20.

It will be noted that the adjustment is effective at the position where the inner jaws cut into the cable sheath. When the inner jaws slide in the stripping movement, the jaw 12 moves from the illustrated position along the length of the blade to a position where the blade is relatively unflexed and hence the inner jaw relaxes, under the influence of the spring 14, from the maximum sheath penetration position. This has the important advantage that it reduces the risk of damage to the core in the stripping movement.

I claim:

1. A wire stripper comprising a pair of outer jaws rockable toward one another about an axis for gripping the sheath of a cable, a pair of inner jaws between the outer jaws and movable toward one another in response to movement of the outer jaws toward one another, said inner jaws having cutting teeth which may penetrate and cut said sheath to a depth dependent upon the position of the inner jaws relative to the outer jaws, and means for displacing the inner jaws axially of the cable while said cutting teeth penetrate said sheath so as to strip the cut portion of the sheath from the cable, characterized in that a cam is mounted eccentrically on one of said outer jaws by a pin extending transversely of said outer jaw for movement therewith and for eccentric angular movement about said pin relative to said one of said outer jaws, the eccentric angular movement of said cam being effective to vary the position of one inner jaw relative to said one of said outer jaws so as to change the depth of penetration of the cutting teeth into the cable sheath.

2. The wire stripper as claimed in claim 1 wherein said cam has an integral radial projection extending to the exterior of said one outer jaw for angularly shifting the cam.

3. The wire stripper as claimed in claim 1 or claim 2 wherein a blade spring is disposed between said cam and said one inner jaw.

4. The wire stripper as claimed in claim 3 wherein said cam is serrated and that a face of the blade spring confronting said cam is likewise serrated.

5. The wire stripper according to claim 1 including a spring yieldably biasing said one inner jaw toward the other inner jaw and enabling said one inner jaw to move away from said other inner jaw in response to said axial displacement of said inner jaws while the penetration of said cutting teeth is maintained.

\* \* \* \* \*